Patented Sept. 30, 1952

2,612,002

UNITED STATES PATENT OFFICE 2,612,002

METHOD OF MANUFACTURING A MAXIMUM REGISTERING THERMOMETER

Robert D. Thompson, Penfield, and Laurence C. Liberatore, Rochester, N. Y., assignors to Taylor Instrument Companies, Rochester, N. Y., a corporation of New York No Drawing. Application May 9, 1950, Serial No. 161,022

14 Claims. (Cl. 49—79)

This invention relates to an improved method of making a maximum registering liquid-in-glass thermometer.

In the conventional method of manufacturing maximum registering thermometers, such as clinical thermometers, unwanted air enters the thermometer blank and must be removed before the temperature range of the thermometer is set and before the thermometer is finished. In addition, under conventional methods of manufacturing such thermometers the glass at the constriction thereof is in a badly strained condition, which may result in a change in the registering constriction as time passes and in extreme cases, may even result in breakage. A change in the constriction may cause the thermometer to give erratic readings or make it difficult to shake down the mercury. Also air in the thermometer may likewise cause erratic readings.

For convenience in description, the steps hereinafter set forth, with the exception of working the air to the top chamber, are herein referred to as making an "acceptable thermometer blank." The term "acceptable thermometer blank" is broad enough also to include any unfilled maximum registering glass thermometer having a bulb of specified volume, communicating with the bore of a glass capillary tube or stem, the bore having specified dimensions and having a constriction therein of specified characteristics located adjacent the bulb.

In the current manufacture of a clinical thermometer, there is first made a blown blank comprising a capillary tube or stem and a bulb fused to one end of the stem with the capillary bore communicating with the bulb and having a contraction chamber in the bore at a point adjacent the bulb. This blank is then filled with mercury, heated out and selected to determine if its range characteristics meet specifications. The blank is thereupon top chambered which involves melting together the glass at the top of the stem and causing mercury to enter the softened section. The mercury vaporizes and blows the softened glass into a bulb or top chamber. When the blank has cooled, there exists in the thermometer a partial vacuum in the bore above the mercury column, but not a complete vacuum since the bore contained some air before the top chamber was formed. This blank is now manipulated in such a manner that the mercury is divided, part going into the top chamber and part remaining in the bulb, but the contraction chamber and stem bore above and below the contraction chamber, are free of mercury. This transfers part of the air into the contraction chamber. The contraction chamber is then constricted in the well-known manner by heating, and the constriction is tested to determine when it is satisfactory. The constricting operation also introduces a further amount of gas into the tube, this gas coming from the walls of the glass due to the heat applied during the constricting operation. This gas and the air originally trapped in the tube are commonly referred to as air.

After the constriction in the blank has been found satisfactory, this air must be worked into the top chamber and then removed with the top chamber when the top chamber is cut off. The step of working this air into the top chamber is known as uniting or air removal and is very laborious. Good results require much hand labor in this operation and even then the air very often is not completely removed.

In accordance with the present invention, there is provided an improved method of making a maximum registering thermometer such as a clinical thermometer, whereby substantially all of the air is removed from the interior of the blank including the constriction, and whereby the glass of the blank is substantially annealed or suitably aged.

Generally, in this improved method an acceptable blank including a satisfactory constriction is made as described. Next the top chamber is cut off and the mercury is removed from the above blank in a centrifuge. Slight traces of mercury trapped at the constriction are removed by vacuum outgassing at 500–700° F. The thermometer blank is then annealed and/or aged. During the annealing or aging step any organic matter or carbon accumulated on the glass during outgassing, is burned away. The acceptable blank made as described above or by any other satisfactory method is outgassed at 600–650° F. and at a pressure less than 0.1 micron of mercury. While still under vacuum, the blank is cooled to room temperature and mercury is caused to surround the lower end of the stem and to completely close-off the bore. Release of the vacuum forces mercury into the bore as far as the constriction. Complete filling of the blank is effected by applying up to 80–120 pounds per square inch air pressure to the surrounding mercury. The following steps with the exception of the graduating step are herein referred to as fabricating a finished blank. The completely filled blank is top chambered with the stem full of mercury while preventing reentry of air into the top chambered blank. The blank is now finished while keeping the stem bore just above the constriction filled with mercury at all times until the top chamber is removed and the top rounded. The thermometer is then graduated.

The term "finished constriction" as used in the claims means a constriction in its final form as it exists in the finished thermometer.

While the present method is suitable for manufacturing any maximum registering thermometer it is particularly adapted for use in the manufacture of clinical thermometers similar in construction to that described in the patent to Yankauer, #626,124, granted May 30, 1899.

What we claim is:

1. A stage in the method of manufacturing a maximum registering glass thermometer substantially free from air therein which comprises making an acceptable mercury-filled sealed blank, opening the upper end of the blank, removing the mercury from the blank, evacuating the empty blank to essentially remove all air therefrom, filling the evacuated blank with the required amount of mercury, and sealing the filled blank without trapping any substantial amount of air therein.

2. A stage in the method of manufacturing a maximum registering glass thermometer substantially free from air therein which comprises making an acceptable mercury-filled sealed blank, opening the upper end of the blank, removing the mercury from the blank, annealing the glass of the blank to remove the strain therefrom, evacuating the empty blank to a pressure less than a micron in value, filling the evacuated blank with the required amount of mercury in the absence of air, and sealing the blank thus filled without trapping any substantial amount of air therein.

3. A stage in the method of manufacturing a maximum registering glass thermometer substantially free from air therein which comprises making an acceptable mercury-filled sealed blank, opening the upper end of the blank, removing the mercury from the blank, removing a substantial amount of strain from the glass of the blank to minimize subsequent volume changes in the bulb and in the constriction, evacuating the empty blank to a pressure less than a micron in value, filling the evacuated blank with the required amount of mercury without trapping air therein, and sealing the blank thus filled without trapping any substantial amount of air therein.

4. A stage in the method of manufacturing a maximum registering glass thermometer substantially free from air therein which comprises making an acceptable mercury-filled sealed blank, opening the upper end of the blank, removing the mercury from the blank, annealing the glass of the blank to remove strain therefrom, outgassing the empty blank by evacuating it to a pressure less than a micron in value while heating it to a temperature or temperatures in the range from 300° to 700° F., filling the evacuated blank with the required amount of mercury in the absence of air, and sealing the blank thus filled without trapping any substantial amount of air therein.

5. A stage in the method of manufacturing a maximum registering glass thermometer substantially free from air therein which comprises making an acceptable mercury-filled sealed blank, opening the upper end of the blank, removing the mercury from the blank, removing strain from the glass of the blank to minimize subsequent volume changes in the bulb and in the constriction, outgassing the empty blank by evacuating it to a pressure less than a micron in value while heating it to a temperature or temperatures in the range from 300° to 700° F., filling the evacuated blank with the required amount of mercury in the absence of air, and sealing the blank thus filled without trapping any substantial amount of air therein.

6. A stage in the method of manufacturing a maximum registering glass thermometer substantially free from air therein which comprises making an acceptable mercury-filled sealed blank, opening the upper end of the blank, removing the mercury from the blank, outgassing the empty blank by evacuating it to a pressure less than a micron in value while heating it to a temperature or temperatures in the range from 300° to 700° F., filling the evacuated blank with the required amount of mercury in the absence of air, and sealing the blank thus filled without trapping any substantial amount of air therein.

7. A stage in the method of manufacturing a maximum registering glass thermometer substantially free from air therein which comprises making an acceptable mercury-filled sealed blank, opening the upper end of the blank, removing the mercury from the blank, annealing the glass of the blank to remove strain therefrom, outgassing the empty blank by evacuating it to a pressure less than a micron in value while heating it to a temperature or temperatures in the range from 300° to 700° F., filling a part of the blank with mercury by atmospheric pressure and filling the remainder of the blank with required amount of mercury by compressed air without introducing substantially any air in the blank, and sealing the blank thus filled without trapping any substantial amount of air therein.

8. A stage in the method of manufacturing a maximum registering glass thermometer substantially free from air therein which comprises making an acceptable mercury-filled sealed blank, opening the upper end of the blank, removing the mercury from the blank, removing strain from the glass to minimize subsequent volume changes in the bulb and in the constriction, outgassing the empty blank by evacuating it to a pressure less than a micron in value while heating it to a temperature or temperatures in the range from 300° to 700° F., filing a part of the blank with mercury by atmospheric pressure and filling the remainder of the blank with required amount of mercury by compressed air without introducing substantially any air in the blank, and sealing the blank thus filled without trapping any substantial amount of air therein.

9. A stage in the method of manufacturing a maximum registering glass thermometer substantially free from air therein which comprises making an acceptable mercury-filled sealed blank, opening the upper end of the blank, removing the mercury from the blank, outgassing the empty blank by evacuating it to a pressure less than a micron in value while heating it to a temperature or temperatures in the range from 300° to 700° F., filling a part of the blank with mercury by atmospheric pressure and filling the remainder of the blank with the required amount of mercury by compressed air without introducing substantially any air in the blank, and sealing the blank thus filled without trapping any substantial amount of air therein.

10. A stage in the method of manufacturing a maximum registering glass thermometer substantially free from air therein which comprises making an acceptable mercury-filled sealed blank, opening the upper end of the blank, removing the mercury from the blank, removing strain from the glass of the blank to minimize subsequent volume changes in the bulb and in the constriction, outgassing the empty blank by evacuating it to a pressure less than a micron in value while heating it to a temperature or temperatures in the range from 300° to 700° F., immersing the evacuated open end of the blank in a bath of mercury in the absence of air, subjecting the mercury to atmospheric pressure, then subjecting the mercury to compressed air, and sealing the blank thus filled without trapping any substantial amount of air therein.

11. A stage in the method of manufacturing a maximum registering thermometer comprising a glass thermometer blank including a tube provided with a capillary bore and having a bulb sealed to one end of the tube with the bore thereof communicating with said bulb, the bore at the other end of the tube being open, the bulb having a specified volume, the bore having specified dimensions, which stage comprises forming a finished constriction in the capillary bore adjacent said bulb, removing substantially all air from the blank and then forcing mercury under pressure substantially greater than atmospheric pressure, through the finished constriction into said bulb to fill the same and also into said bore.

12. A stage in the method of manufacturing a maximum registering thermometer comprising a glass thermometer blank including a tube provided with a capillary bore and having a bulb sealed to one end of the tube with the bore thereof communicating with said bulb, the bore at the other end of the tube being open, the bulb having a specified volume, the bore having specified dimensions, which stage comprises forming a constriction in the capillary bore adjacent said bulb, removing substantially all air from the blank, then immersing the open end of the bore in mercury in the absence of air, applying pressure of approximately the order of atmospheric pressure to the mercury for filling the bore as far as the constriction, and then completely filling the bulb by applying pressure to the mercury in excess of atmospheric pressure to force the mercury through the constriction into the bulb.

13. A stage in the method of manufacturing a maximum registering thermometer comprising a glass thermometer blank including a tube provided with a capillary bore and having a bulb sealed to one end of the tube with the bore thereof comunicating with said bulb, the bore at the other end of the tube being open, the bulb having a specified volume, the bore having specified dimensions, which comprises forming a finished constriction in the capillary bore adjacent said bulb, annealing the thermometer blank to remove strain from the glass thereof, removing substantially all air from the blank and then forcing mercury under pressure substantially greater than atmospheric pressure, through the finished constriction into said bulb to fill the same and also into said bore.

14. A stage in the method of manufacturing a maximum registering thermometer comprising a glass thermometer blank including a tube provided with a capillary bore and having a bulb sealed to one end of the tube with the bore thereof communicating with said bulb, the bore at the other end of the tube being open, the bulb having a specified volume, the bore having specified dimensions, which comprises forming a finished constriction in the capillary bore adjacent said bulb, removing strain from the glass of the blank to minimize subsequent volume changes in the bulb and in the constriction, removing substantially all air from the blank, and filling the bulb through the constriction and at least a portion of the bore with mercury introduced under a pressure of the order of eighty pounds per square inch.

ROBERT D. THOMPSON.
LAURENCE C. LIBERATORE.

REFERENCES CITED

The following references are of record in the file of this patent:

UNITED STATES PATENTS

| Number | Name | Date |
| --- | --- | --- |
| 318,985 | Hicks | June 2, 1885 |
| 460,013 | Hicks et al. | Sept. 22, 1891 |
| 626,124 | Yankauer | May 30, 1899 |
| 1,255,979 | Berberich | Feb. 12, 1918 |
| 1,274,576 | Moeller | Aug. 6, 1918 |
| 1,345,347 | Chaney | July 6, 1920 |
| 1,925,502 | Schaeffer | Sept. 5, 1933 |
| 2,148,630 | Lillie et al. | Feb. 28, 1939 |